United States Patent
Hill et al.

(10) Patent No.: US 9,848,745 B2
(45) Date of Patent: Dec. 26, 2017

(54) COMPRESSOR FLOW PATH

(71) Applicant: Dyson Technology Limited, Wiltshire (GB)

(72) Inventors: Robert Stanley Hill, Bath (GB); Andrew Charlton Clothier, Swindon (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 738 days.

(21) Appl. No.: 14/268,636

(22) Filed: May 2, 2014

(65) Prior Publication Data
US 2014/0325789 A1    Nov. 6, 2014

(30) Foreign Application Priority Data
May 3, 2013   (GB) .................................. 1308090.8

(51) Int. Cl.
*A47L 5/22*    (2006.01)
*A47L 5/24*    (2006.01)
(Continued)

(52) U.S. Cl.
CPC ............... *A47L 5/24* (2013.01); *A47L 9/0081* (2013.01); *A47L 9/22* (2013.01); *F04D 17/16* (2013.01); *F04D 25/082* (2013.01); *F04D 29/162* (2013.01); *F04D 29/441* (2013.01); *F04D 29/5806* (2013.01); *F04D 29/668* (2013.01); *H02K 1/185* (2013.01); *H02K 5/24* (2013.01); *H02K 9/06* (2013.01); *H02K 11/33* (2016.01)

(58) Field of Classification Search
CPC . A47L 5/24; A47L 9/22; A47L 9/0081; A47L 5/22; H02K 11/33; H02K 1/185; H02K 5/24; H02K 9/06; F04D 17/16; F04D 25/082; F04D 29/688; F04D 29/162; F04D 29/5806; F04D 29/441
See application file for complete search history.

(56) References Cited

U.S. PATENT DOCUMENTS

| | | | |
|---|---|---|---|
| 4,978,281 | A | 12/1990 | Conger, IV |
| 5,110,266 | A | 5/1992 | Toyoshima et al. |

FOREIGN PATENT DOCUMENTS

| | | |
|---|---|---|
| DE | 196 16 156 | 10/1997 |
| DE | 198 43 719 | 4/1999 |

(Continued)

OTHER PUBLICATIONS

International Search Report and Written Opinion dated Aug. 12, 2014, directed to International Application No. PCT/GB2014/051291; 12 pages.

(Continued)

*Primary Examiner* — David Redding
(74) *Attorney, Agent, or Firm* — Morrison & Foerster LLP (57) ABSTRACT

A product that includes a compressor, a housing and a vibration isolation mount located between the compressor and the housing. The compressor includes an impeller, a first inlet located upstream of the impeller, a first outlet located downstream of the impeller, a second inlet located downstream of the first outlet, and a second outlet located downstream of the second inlet. During operation, fluid enters the compressor via the first inlet and exits the compressor via the first outlet. The mount creates a restriction between the compressor and the housing that causes fluid exiting the first outlet to re-enter the compressor via the second inlet.

17 Claims, 4 Drawing Sheets

(51) Int. Cl.
*F04D 29/44* (2006.01)
*F04D 29/66* (2006.01)
*A47L 9/00* (2006.01)
*F04D 29/16* (2006.01)
*F04D 29/58* (2006.01)
*H02K 5/24* (2006.01)
*F04D 25/08* (2006.01)
*A47L 9/22* (2006.01)
*H02K 1/18* (2006.01)
*H02K 9/06* (2006.01)
*F04D 17/16* (2006.01)
*H02K 11/33* (2016.01)

(56) References Cited

FOREIGN PATENT DOCUMENTS

| | | |
|---|---|---|
| DE | 10 2005 058 940 | 6/2007 |
| DE | 20 2006 012 489 | 1/2008 |
| EP | 0 385 298 | 9/1990 |
| FR | 2 412 976 | 7/1979 |
| GB | 2468299 | 9/2010 |

OTHER PUBLICATIONS

Search Report dated Nov. 11, 2013, directed to GB Application No. 1308090.8, 1 page.

COMPRESSOR FLOW PATH

REFERENCE TO RELATED APPLICATION

This application claims priority of United Kingdom Application No. 1308090.8, filed May 3, 2013, the entire contents of which are incorporated herein by reference.

FIELD OF THE INVENTION

The present invention relates to a compressor and the path taken by fluid flowing through the compressor.

BACKGROUND OF THE INVENTION

The casing of a compressor may be configured such that fluid exiting the impeller is returned through the interior of the compressor so as to cool components of the compressor. However, this then increases the overall size of the compressor.

SUMMARY OF THE INVENTION

The present invention provides a product comprising a compressor, a housing, and a vibration isolation mount located between the compressor and the housing, wherein the compressor comprises an impeller, a first inlet located upstream of the impeller, a first outlet located downstream of the impeller, a second inlet located downstream of the first outlet, and a second outlet located downstream of the second inlet, and during operation fluid enters the compressor via the first inlet and exits the compressor via the first outlet, and the mount creates a restriction between the compressor and the housing that causes fluid exiting the first outlet to re-enter the compressor via the second inlet.

Rather than using the casing of the compressor, the present invention instead uses the housing and the mount to return fluid back into the interior of the compressor. As a result, a more compact arrangement may be achieved.

The impeller may be a centrifugal impeller, which is able to achieve relatively high mass flow rates and efficiencies in relation to its size. Fluid then enters the compressor via the first inlet in an axial direction, and fluid exits the compressor via the first outlet in a radial direction. By ensuring that fluid exits the first outlet in a radial direction, the compressor is not required to turn the fluid exiting the impeller. As a result, a relatively compact compressor may be achieved. Additionally, flow losses within the compressor may be reduced.

A linear path may be established between the outlet of the impeller and the first outlet. This then has the advantage of reducing losses that might otherwise occur if the fluid were required to turn between the impeller and the first outlet.

The compressor may comprise a diffuser and the first outlet may surround the diffuser. Indeed, the first outlet may be the outlet of the diffuser. By surrounding the diffuser, a relatively large surface area may be achieved for the outlet whilst maintaining a relatively low height for the outlet. Additionally, since the outlet surrounds the diffuser, fluid exiting the compressor via the outlet further diffuses as the fluid expands into the space between the compressor and the housing.

The first outlet may comprise an annular opening formed around the compressor. This then has the advantage that the height of the outlet may be kept relatively low whilst maintaining a relatively large surface area for the outlet. Consequently, a relatively compact compressor may be achieved. Additionally, since the outlet is annular, fluid exiting the compressor via the outlet diffuses as the fluid expands into the space between the compressor and the housing.

The compressor may comprise an electric motor for driving the impeller. Excessive temperatures within the compressor may cause components of the motor to fail. Accordingly, the fluid flowing between the second inlet and the second outlet may act to cool one or more components of the motor. In particular, the fluid may act to cool an electrical winding or a power switch of the motor. As a result, the winding and switch are able to carry higher currents and thus the motor is able to operate at higher electrical power.

The mount may surround the compressor and isolate the housing from radial vibration of the compressor.

The mount may form a seal between the compressor and the housing such that all of the fluid exiting the compressor via the first outlet re-enters the compressor via the second inlet. This then provides improved cooling of components housed within the compressor.

The mount may comprise a plurality of ribs or studs that deform to isolate the housing from vibration of the compressor, and a lip seal for creating the seal between the compressor and the housing. By providing ribs or studs, the mount is able to achieve relatively good isolation since contact with the housing or compressor may be achieved over a relatively small surface area.

The mount may isolate the housing from radial and axial vibration of the compressor. Moreover, the mount may create a seal between the compressor and the housing at a position between the first inlet and the first outlet. This then has the advantage that a single mount may be used to absorb radial and axial vibration as well as to create a seal between the first inlet and the first outlet and a restriction between the second inlet and the second outlet. As a result, assembly of the product may be simplified.

Alternatively, the mount may absorb radial vibration and the product may comprise a further mount for absorbing axial vibration. The further mount then creates a seal between the compressor and the housing at a position between the first inlet and the first outlet. This then has the advantage that the two mounts may be moulded with features that would otherwise be difficult to achieve with a single mount. Additionally, materials having different physical properties may be used for the two mounts. For example, the two mounts may be formed of materials having different Shore hardness, such that each mount has a resilience suited to the particular vibrations that the mount is intended to isolate.

The mount or further mount may turn the fluid exiting the first outlet in a direction towards the second inlet. In particular, the mount or further mount may include a curved surface for turning the fluid. As a result, the fluid follows a smoother path between the first outlet and the second inlet, thus reducing flow losses.

The present invention further provides a product comprising a compressor, a housing, and one or more vibration isolation mounts located between the compressor and the housing, wherein the compressor comprises a first inlet, a first outlet located downstream of the first inlet, a second inlet located downstream of the first outlet, and a second outlet located downstream of the second inlet, the mounts create a first seal and a second seal between the compressor and the housing, the first seal is located between the first inlet and the first outlet, the second seal is located between the second inlet and the second outlet, and the compressor, the housing, the first seal and the second seal delimit a chamber that is open to the first outlet and the second inlet and is closed to the first inlet and the second outlet such that, during operation, fluid enters the compressor via the first inlet, exits the compressor and enters the enclosed chamber via the first outlet, exits the enclosed chamber and re-enters the compressor via the second inlet, and exits the compressor via the second outlet.

BRIEF DESCRIPTION OF THE DRAWINGS

In order that the present invention may be more readily understood, an embodiment of the invention will now be described, by way of example, with reference to the accompanying drawings, in which.

DETAILED DESCRIPTION OF THE INVENTION

Figure 1:
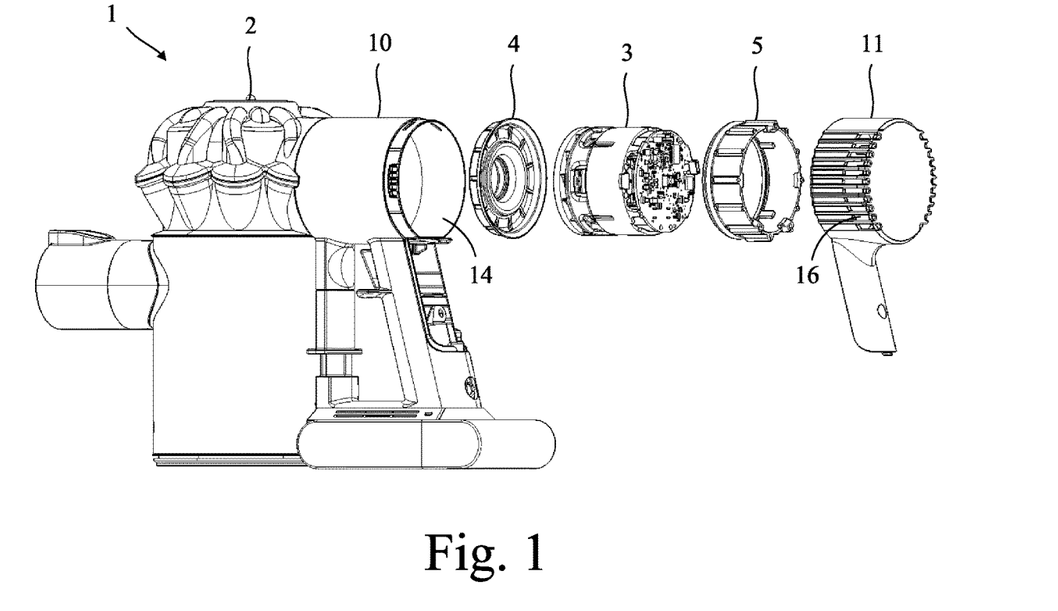
FIG. 1 is an exploded view of a product in accordance with the present invention.

The product 1 of FIG. 1 comprises a housing 2, a compressor 3, an axial mount 4 and a radial mount 5. Each of the mounts 4,5 is located between the housing 2 and the compressor 3 and acts to isolate the housing 2 from vibration generated by the compressor 3. In this particular example, the product 1 is a handheld vacuum cleaner.

Figure 2:
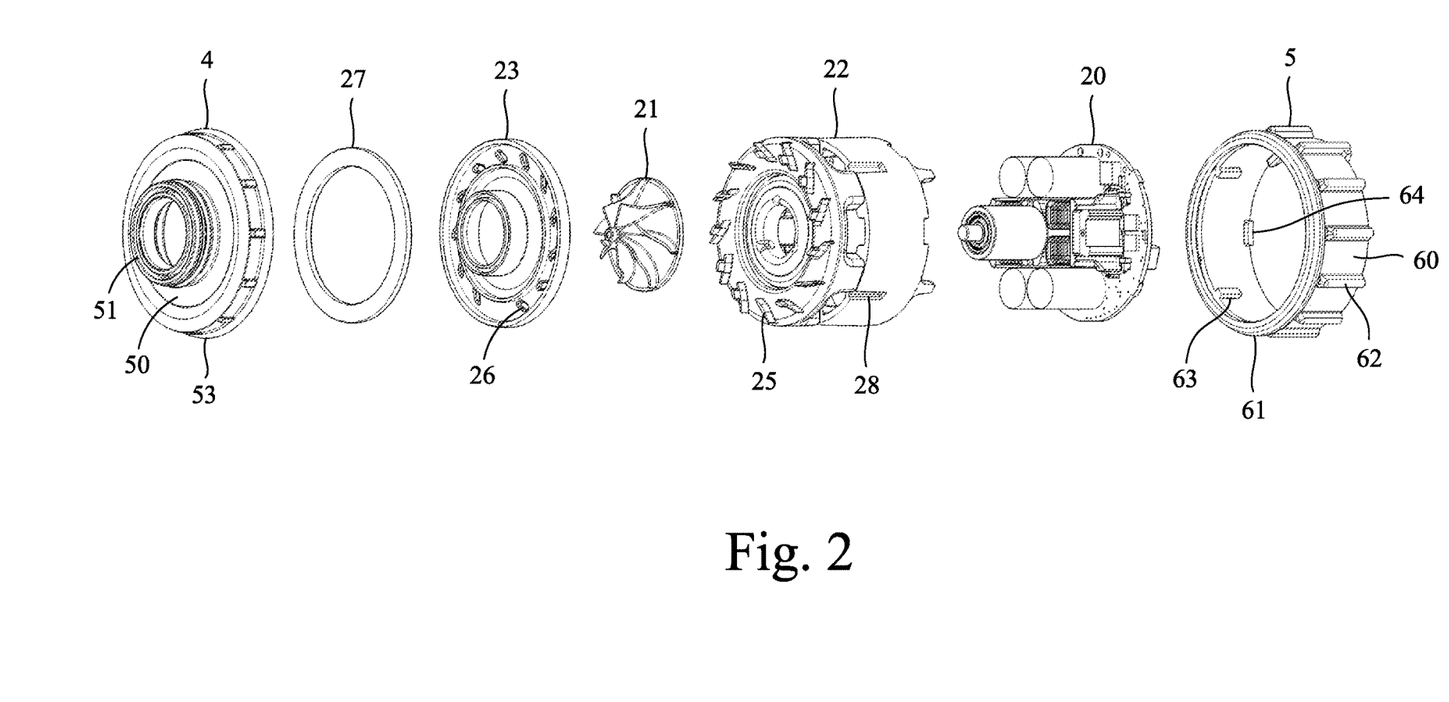
FIG. 2 is an exploded view of the compressor and vibration isolation mounts of the product.
Figure 3:
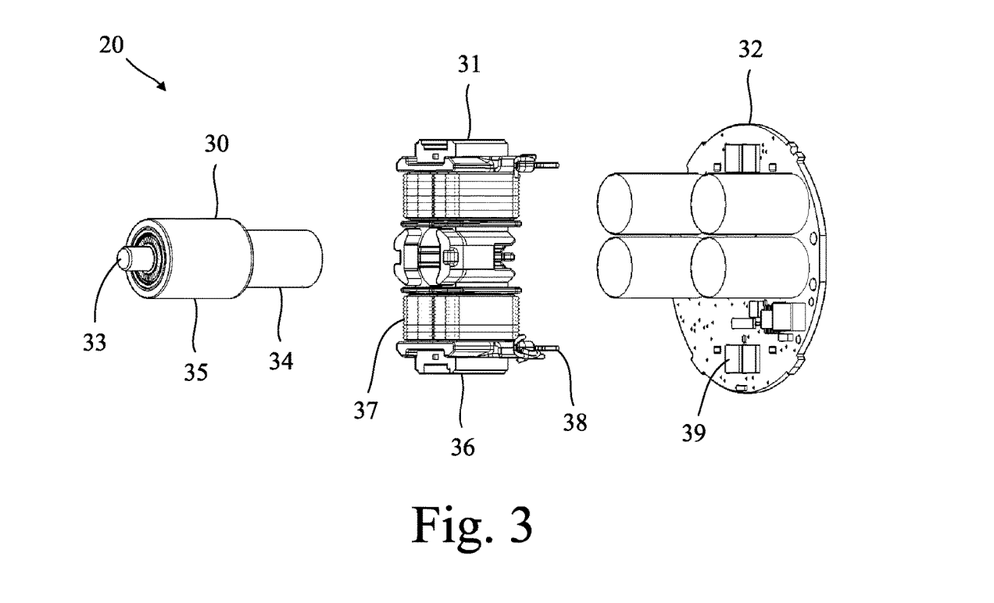
FIG. 3 is an exploded view of the motor of the compressor.

Referring now to FIGS. 2 and 3, the compressor 3 comprises an electric motor 20, an impeller 21, a frame 22 and a shroud 23.

The motor 20 comprises a rotor assembly 30, a stator assembly 31 and a circuit assembly 32. The rotor assembly 30 comprises a shaft 34 to which a rotor core 35 and a bearing assembly 36 are attached. The stator assembly 31 comprises a pair of stator cores 37 around which electrical windings 38 are wound. The windings 38 are connected to the circuit assembly 32 via terminal connectors, which also act to secure the circuit assembly 32 to the stator assembly 31. The rotor assembly 30 and the stator assembly 31 are each secured to the frame 22, with the rotor assembly 30 being secured to the frame 22 by means of the bearing assembly 36.

The impeller 21 is a centrifugal impeller and is secured to the shaft 34 of the motor 20.

The shroud 23 overlies the impeller 21 and one end of the frame 22. The shroud 23 and the frame 22 extend radially beyond the impeller 21 and define a diffuser 24 that surrounds the impeller 21. The frame 22 includes a plurality of diffuser vanes 25 that extend through holes 26 in the shroud 23. A ring of adhesive 27 then secures the shroud 23 to the vanes 25 and seals the holes 26.

Figure 4:
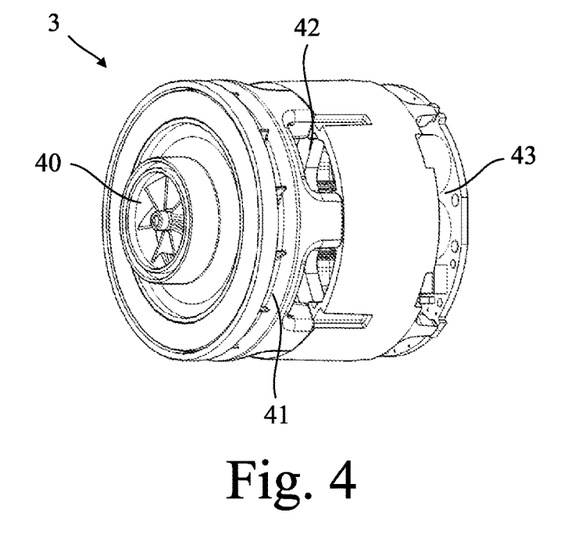
FIG. 4 is an axonometric view of the compressor.
Figure 5:
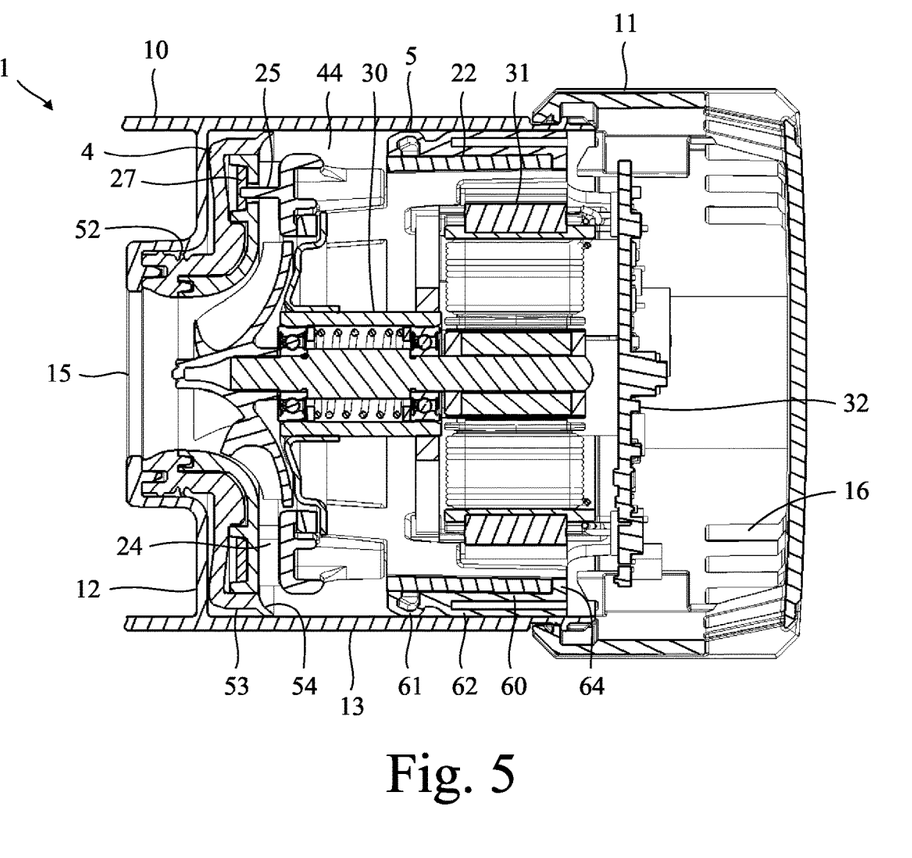
FIG. 5 is a sectional view through the compressor, the vibration isolation mounts and part of the housing of the product.

The compressor 3 comprises a first inlet 40 located upstream of the impeller 21, a first outlet 41 located downstream of the impeller 21, a second inlet 42 located downstream of the first outlet 41, and a second outlet 43 located downstream of the second inlet 42.

The first inlet 40 corresponds to the inlet in the shroud 23 and comprises a circular aperture located at the centre of the shroud 23. The first outlet 41 comprises an annular aperture that is defined by the axial gap that exists between the frame 22 and the shroud 23 at the periphery. The first outlet 41 therefore surrounds the diffuser 24. Indeed, the first outlet 41 may be regarded as the outlet of the diffuser 24. The second inlet 42 is located below the first outlet 41 and comprises a plurality of apertures that are formed around the frame 22. The second outlet 43 likewise comprises a plurality of apertures that are defined between the end of the frame 22 and the circuit assembly 32.

The axial mount 4 is formed of an elastomeric material such as natural or synthetic rubber (e.g. EPDM). The axial mount 4 is similar in shape to that of the shroud 23 and comprises a disk-shaped portion 50 and a cylindrical portion 51 that extends upwardly from the disk-shaped portion 50. The cylindrical portion 51 includes a lip seal 52 that extends around the outside of the cylindrical portion 51. The disk-shaped portion 50 includes a downwardly-projecting projecting rim 53. Moreover, the free end of the rim 53 flares outward slightly to define a curved lip 54. As explained below, this lip 54 helps to direct fluid exiting the first outlet 41 towards the second inlet 42. The axial mount 4 attaches to the shroud 23 of the compressor 3. More specifically, the cylindrical portion 51 seals against the shroud inlet 40 and the rim 53 stretches over and forms an interference fit with the perimeter of the shroud 23.

The radial mount 5 is likewise formed of an elastomeric material and comprises a sleeve 60, a lip seal 61, a plurality of ribs 62, a plurality of locking stubs 63, and a plurality of end stubs 64. The lip seal 61 is located at and extends around one end of the sleeve 60. The ribs 62 are spaced around the outside of the sleeve 60 and extend axially along the length of the sleeve 60. The locking stubs 63 are rectangular in shape and are spaced around the inside of the sleeve 60. The end stubs 64 extend beyond the opposite end of the sleeve 60. Additionally, the end stubs 64 project radially inward from the sleeve 60.

The radial mount 5 attaches to the frame 22 of the compressor 3. The sleeve 60 stretches over and forms an interference fit with the frame 22. The locking stubs 63 then engage with corresponding recesses 28 formed around the outside of the frame 22, whilst the end stubs 64 engage with the free end of the frame 22. The locking stubs 63 act to align the compressor 3 and the radial mount 5. The locking stubs 63 also act to prevent the compressor 3 from rotating relative to the radial mount 5, whilst the locking stubs 63 and end stubs 64 act to prevent the compressor 3 from moving axially relative to the radial mount 5. Consequently, when inserting the compressor 3 and mounts 4,5 into the housing 2, the compressor 3 does not move relative to the mounts 4,5.

The housing 3 comprises a front section 10 and a rear section 11. The front section 10 comprises an end wall 12 and a side wall 13 that define a generally cylindrical recess 14 within which the compressor 3 and the mounts 4,5 are located. The axial mount 4 abuts the end wall 12, and the lip seal 52 seals against the end wall 12. The radial mount 5 abuts the side wall 13. Moreover, the lip seal 61 seals against the side wall 13, and the ribs 62 are crushed slightly by the side wall 13.

The rear section 11 attaches to the front section 10 so as to close the recess 14. The rear section 11 comprises a number of flanges (not shown) that abut the end stubs 64 of the radial mount 5. The compressor 3 and mounts 4,5 are thus restrained axially by the end wall 12 of the front section 10 and the flanges of the rear section 11, and are restrained radially by the side wall 13 of the front section 10. The end wall 12 of the front section 10 includes an inlet aperture 15 through which fluid enters compressor 3, and the rear section 11 comprises a plurality of exhaust apertures 16 through which fluid from the compressor 3 is exhausted.

The lip seal 52 of the axial mount 4 creates a seal between the housing 2 and the compressor 3 at a position between the first inlet 40 and the first outlet 41, whilst the lip seal 61 of the radial mount 5 creates a seal between the housing 2 and the compressor 3 at a position between the second inlet 42 and the second outlet 43. The two seals 52,61, the housing 2 and the compressor 3 collectively delimit a chamber 44 that is open to the first outlet 41 and the second inlet 42, and is closed to the first inlet 40 and the second outlet 43.

Figure 6:
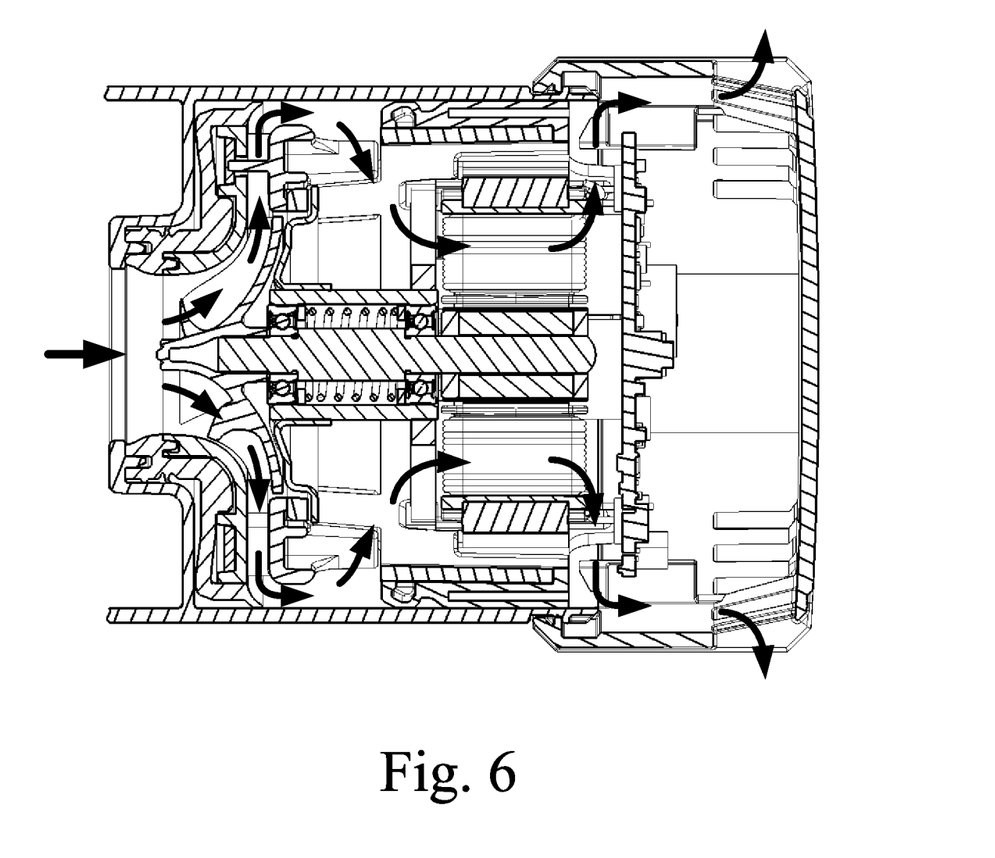
FIG. 6 is the same sectional view as that of FIG. 5 highlighting the path taken by fluid flowing through the product.

During operation, fluid enters the compressor 3 via the first inlet 40. The fluid is centrifuged outwards by the impeller 21, flows through the diffuser 22 and exits the compressor 3 via the first outlet 41. On exiting the compressor 3, the fluid enters the chamber 44 delimited by the seals 52,61. Since the chamber 44 is open only to the first outlet 41 and the second inlet 42, the fluid re-enters the compressor 3 via the second inlet 42. The fluid then passes through the interior of the compressor 3 and exits the compressor 3 via the second outlet 43.

The second inlet 42 is located upstream and the second outlet 43 is located downstream of various components of the motor 20, e.g. the bearing assembly 36, the rotor core 35, the stator assembly 31 and the circuit assembly 32. Consequently, as fluid flows between the second inlet 42 and the second outlet 43, the fluid acts to cool these components.

A conventional compressor may be configured such that fluid exiting the impeller is returned through the interior of the compressor so as to cool components of the motor. However, the fluid is typically returned by the outer casing of the compressor, which includes one or more bends for turning the fluid that exits the impeller. As a result, the overall size of the compressor is increased. Rather than using the casing of the compressor, the housing 2 and the mounts 4,5 are instead used to return the fluid back into the interior of the compressor 3. As a result, a more compact arrangement may be achieved.

Owing to the locations of the first inlet 40 and the first outlet 41, fluid enters the compressor 3 in an axial direction (i.e. in a direction parallel to the axis of rotation of the impeller 21) and exits in a radial direction (i.e. in a direction normal to the axis of rotation). Moreover, a linear path is established between the outlet of the impeller 21 and the first outlet 41. Fluid exiting the impeller 21 is not therefore required to turn axially within the compressor 3 before exiting via the first outlet 41. As a result, a more compact arrangement may be achieved. Additionally, flow losses within the compressor 3 may be reduced.

The first outlet 41 comprises an annular opening that surrounds or forms the exit of the diffuser 24. This then has the advantage that the height of the first outlet 41 may be kept relatively low whilst maintaining a relatively large surface area for the outlet 41. Consequently, a relatively compact compressor 3 may be achieved without the first outlet 41 creating a restriction or otherwise impeding the fluid flow. Additionally, since the first outlet 41 is annular, fluid exiting the compressor 3 via the outlet 41 further diffuses as the fluid expands into the chamber 44 between the housing 2 and the compressor 3. Conceivably, the diffuser 24 may be omitted and the first outlet 41 may form the outlet of the impeller 21. This could then lead to a more compact arrangement at the expense of increased flow losses.

The axial mount 4 includes a curved lip 54 located at the first outlet 41 of the compressor 3. The curved lip 54 acts to turn the fluid exiting the first outlet 41 in a direction towards the second inlet 42. Since the lip 54 is curved, the fluid follows a smoother path between the first outlet 41 and the second inlet 42, thus reducing flow losses.

The windings 38 of the stator assembly 31 and the power switches 39 of the circuit assembly 32, which are used to control the flow of current through the windings 38, typically generate high levels of heat owing to the magnitude of the currents carried by them. The second inlet 42 and the second outlet 43 are located such that the fluid flowing through the interior of the compressor 3 acts to cool the windings 38 and the power switches 39. This then has the advantage that the windings 38 and the power switches 39 are able to carry higher currents and thus the motor 20 is able to operate at higher electrical power.

In the embodiment described above, the radial mount 4 forms a seal between the housing 2 and the compressor 3 such that all of the fluid exiting the compressor 3 via the first outlet 41 is caused to re-enter the compressor 3 via the second inlet 42. This then has the advantage of maximising cooling since all of the available fluid is returned through the interior of the compressor 3. However, it may not be necessary to return all of the fluid exiting the first outlet 41 through the interior of the compressor 3 in order to achieve the necessary cooling. Moreover, improved performance (e.g. mass flow rate or efficiency) may be achieved by returning only a portion of the fluid through the interior of the compressor 3. Accordingly, rather than forming a seal between the housing 2 and the compressor 3, the radial mount 4 may instead form a partial seal. The partial seal may take the form of a lip or rim that contacts and seals against the housing 2 around only a part of the compressor 3. Alternatively, the partial seal may take the form of a rim or flange(s) that extend radially toward the housing 2 but do not necessarily contact the housing 2. Accordingly, in a more general sense, the radial mount 4 may be said to create a restriction (seal or partial seal) between the housing 2 and the compressor 3 that causes fluid exiting the first outlet 41 to re-enter the compressor 3 via the second inlet 42. Where a partial seal is created between the housing 2 and the compressor 3, part of the fluid exiting the first outlet 41 re-enters the compressor 3 via the second inlet 42 and part of the fluid bypasses the second inlet 42. For example, in the embodiment illustrated in FIGS. 5 and 6, fluid bypassing the second inlet 42 would flow axially between the housing 2 and the compressor 3 and exit the product 1 via the exhaust openings 16. Since this bypass fluid is not required to turn or collide with components of the motor 20, improved performance may be achieved.

In the embodiment described above, the product 1 comprises two distinct mounts 4,5 for isolating the housing 2 from axial and radial vibration of the compressor 3. This then has the advantage that the two mounts 4,5 may be moulded or otherwise formed with features that would otherwise be difficult to achieve with a single mount. Additionally, if required, materials having different physical properties may be used for the two mounts 4,5. For example, the two mounts 4,5 may be formed of materials having different Shore hardness such that each mount 4,5 has a resilience better suited to the particular vibrations that the mount 4,5 is intended to isolate. In spite of the aforementioned advantages, a single mount may instead be used to isolate the housing 2 from both axial and radial vibration. Indeed, a single mount is likely to simplify the assembly of the product 1.

The radial mount 5 comprises ribs 62 that extend axially along the length of the sleeve 60. Conceivably, rather than extending axially, the ribs 62 may extend circumferentially around the sleeve 60. This would then avoid the need for a separate lip seal 61 since the ribs would create the necessary seal between the housing 2 and the compressor 3. However, a disadvantage with this arrangement is that the circumference of the sleeve 60 is greater than the length of the sleeve 60. As a result, circumferential ribs are likely to contact the housing 2 over a greater surface area and thus transmit more of the vibration from the compressor 3 to the housing 2. Axial ribs 62 have the further advantage that, when inserting the compressor 3 and the mounts 4,5 axially into the recess 14, the ribs 62 are crushed radially and thus the radial compliance of the ribs 62 is relatively well controlled. In contrast, if the ribs 62 were to extend circumferentially around the sleeve 60, the ribs would most likely be pulled axially rather than be crushed radially as the compressor 3 and the mounts 4,5 are inserted into the recess 14. This may then adversely affect the radial compliance of the ribs and thus the efficacy of the ribs to absorb and isolate radial vibration. As an alternative to ribs 62, the radial mount 5 may comprise tapered studs (e.g. conical studs) located around the outside of the sleeve 60. By employing tapered studs, it may be possible to mount the compressor 3 within the housing 2 over fewer points of contact, thus potentially leading to better isolation. However, a potential problem with this arrangement again arises when inserting the compressor 3 and the mounts 4,5 axially into the recess 14. For example, the studs will most likely be pulled axially rather than crushed radially during insertion and thus control over the radial compliance of the studs may be relatively poor. This problem may be addressed by dividing the first section 10 of the housing 2 into a number of parts (e.g. two semi-cylindrical parts) that are brought together to enclose the compressor 3 and mounts 4,5.

The lip seal 61 of the radial mount 5 is intended only to create a seal between the housing 2 and the compressor 3. The lip seal 61 is not intended to absorb radial vibration of the compressor 3. Consequently, the lip seal 61 is configured such that the seal provides a poor transmission path for vibration of the compressor 3. In particular, the radial compliance of the lip seal 61 is greater than that of the axial ribs 62 or the tapered studs, if employed. As a result, radial vibration of the compressor 3 is opposed by the ribs 62 or studs rather than the lip seal 62. Consequently, in spite of the fact that lip seal 61 contacts the housing 2 over a relatively large area, the housing 2 continues to be well isolated from vibration of the compressor 3.

The radial mount 5 acts to isolate the housing 2 from radial vibration of the compressor 3, as well as to form an annular seal between the housing 2 and the compressor 3. In the embodiment described above, the seal created by the radial mount 5 ensures that fluid exiting the first outlet 41 of the compressor 3 is returned through the interior of the compressor 3 via the second inlet 42. However, the radial mount 5 may be used to mount other types of compressor within a housing, particularly where fluid exits the compressor in a radial direction. For example, if we consider the embodiment illustrated in FIG. 5, the second inlet 42 of the compressor 3 may be omitted (i.e. closed) and the exhaust openings 16 of the housing 2 may be located at a position approximately indicated by reference numeral 13. The seal created by the radial mount 5 then ensures that fluid exiting the compressor 3 is expelled from the housing 2 via the exhaust openings 16, i.e. the chamber 44 delimited by the seal 61 of the radial mount 5 is open to the first outlet 41 and the exhaust openings 16 only. In both this alternative embodiment and the embodiment described above, the compressor 3 comprises an axial inlet 40 and a radial outlet 41. The axial inlet 40 is located at one end of the compressor 3 and the radial mount 5 forms an annular seal at a position between the radial outlet 41 and the opposite end of the compressor 3.

The invention claimed is:

1. A product comprising a compressor, a housing, and a vibration isolation mount located between the compressor and the housing, wherein the compressor comprises an impeller, a first inlet located upstream of the impeller, a first outlet located downstream of the impeller, a second inlet located downstream of the first outlet, and a second outlet located downstream of the second inlet, and during operation of the compressor fluid enters the compressor via the first inlet and exits the compressor via the first outlet, and the mount creates a restriction between the compressor and the housing that causes fluid exiting the first outlet to re-enter the compressor via the second inlet.

2. The product of claim 1, wherein the impeller is a centrifugal impeller, fluid enters the compressor via the first inlet in an axial direction, and fluid exits the compressor via the first outlet in a radial direction.

3. The product of claim 1, wherein a linear path is established between the outlet of the impeller and the first outlet.

4. The product of claim 1, wherein the compressor comprises a diffuser and the first outlet surrounds the diffuser.

5. The product of claim 1, wherein the first outlet comprises an annular opening formed around the compressor.

6. The product of claim 1, wherein the compressor comprises an electric motor for driving the impeller, and the fluid flowing between the second inlet and the second outlet acts to cool one or more components of the motor.

7. The product of claim 6, wherein the fluid flowing between the second inlet and the second outlet acts to cool an electrical winding or a power switch of the motor.

8. The product of claim 1, wherein the mount surrounds the compressor and isolates the housing from radial vibration of the motor.

9. The product of claim 1, wherein the mount forms a seal between the compressor and the housing such that all of the fluid exiting the compressor via the first outlet re-enters the compressor via the second inlet.

10. The product of claim 9, wherein the mount comprises a plurality of ribs or studs that deform to absorb vibration from the compressor, and a lip seal for creating the seal between the compressor and the housing.

11. The product of claim 1, wherein mount absorbs radial vibration and axial vibration and the mount creates a seal between the compressor and the housing at a position between the first inlet and the first outlet.

12. The product of claim 11, wherein the mount turns fluid exiting the first outlet in a direction towards the second inlet.

13. The product of claim 1, where the mount absorbs radial vibration and the product comprises a further mount for absorbing axial vibration, and the further mount creates a seal between the compressor and the housing at a position between the first inlet and the first outlet.

14. The product of claim 13, wherein the further mount turns fluid exiting the first outlet in a direction towards the second inlet.

15. The product of claim 1, wherein the product is a vacuum cleaner.

16. A product comprising a compressor, a housing, and one or more vibration isolation mounts located between the compressor and the housing, wherein the compressor comprises a first inlet, a first outlet located downstream of the first inlet, a second inlet located downstream of the first outlet, and a second outlet located downstream of the second inlet, the mounts create a first seal and a second seal between the compressor and the housing, the first seal is located between the first inlet and the first outlet, the second seal is located between the second inlet and the second outlet, and the compressor, the housing, the first seal and the second seal delimit a chamber that is open to the first outlet and the second inlet and is closed to the first inlet and the second outlet such that, during operation, fluid enters the compressor via the first inlet, exits the compressor and enters the enclosed chamber via the first outlet, exits the enclosed chamber and re-enters the compressor via the second inlet, and exits the compressor via the second outlet.

17. The product of claim 16, wherein the product is a vacuum cleaner.

\* \* \* \* \*